J. N. KUCERA.
HYDROCARBON SOLDERING INSTRUMENT.
APPLICATION FILED JUNE 19, 1914.
1,127,026.
Patented Feb. 2, 1915.
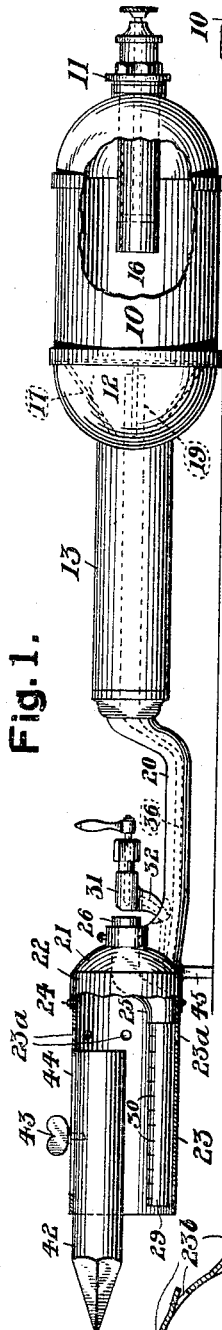
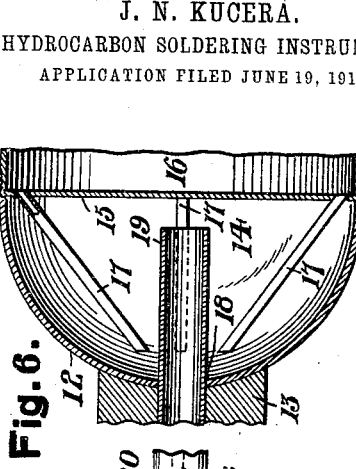
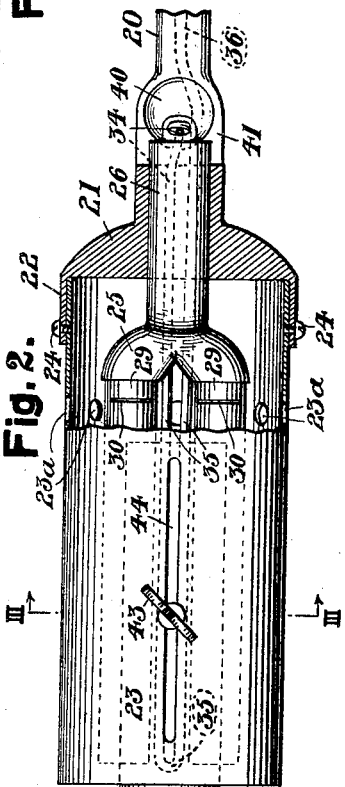
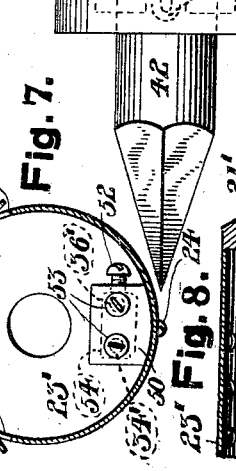
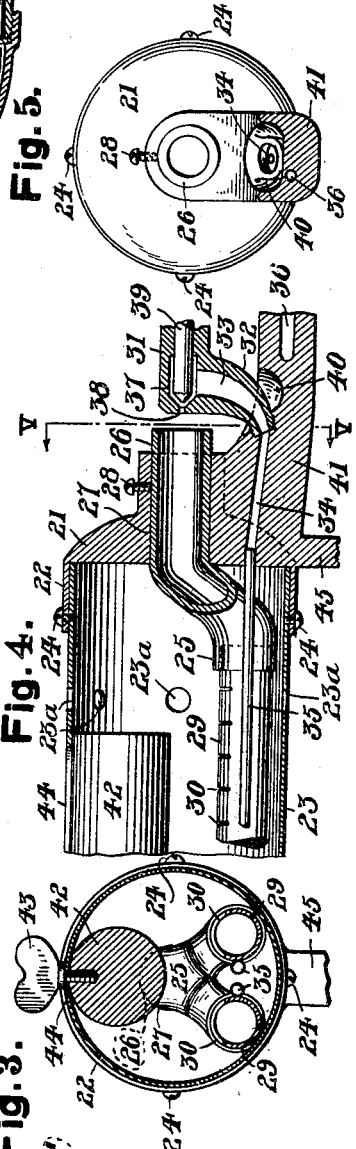
Witnesses
J. S. Burch
J. R. Bryant
Inventor
J. N. Kučera
By A. M. Wilson
Attorney

UNITED STATES PATENT OFFICE.

JOHN N. KUČERÁ, OF CEDAR RAPIDS, IOWA.

HYDROCARBON SOLDERING INSTRUMENT.

1,127,026.  Specification of Letters Patent.  Patented Feb. 2, 1915.

Application filed June 19, 1914. Serial No. 846,119.

*To all whom it may concern:*

Be it known that I, JOHN N. KUČERÁ, a citizen of the United States of America, residing at Cedar Rapids, in the county of Linn and State of Iowa, have invented certain new and useful Improvements in Hydrocarbon Soldering Instruments, of which the following is a specification.

This invention relates to new and useful improvements in hydro-carbon soldering instruments.

The primary object of this invention is to provide a soldering instrument in the form of a unitary device and providing a soldering point heated by the gaseous burner of the instrument.

A further object is to provide a portable fuel tank burner and soldering iron in which the iron is adapted to be heated by a vapor burner from liquid fuel supplied under pressure from the tank.

A still further object is to provide a hydro-carbon heated soldering point that may be employed for doing over-head work.

Another object of the invention is to provide in a hydro-carbon soldering instrument, an adjustable burner that may be moved toward or away from the needle valve that controls the fuel supply, whereby the air supply may be varied at will and the action of the burner thereby regulated.

Still another object is to provide a hydrocarbon soldering instrument with a readily removable burner whereby the device may be quickly converted into a blow torch, or branding or marking device by the substitution of a tube, branding or marking iron as desired.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and in which like designating characters refer to corresponding parts throughout the several views:—Figure 1 is a side elevation of the device, parts being broken away. Fig. 2 is a top plan view upon an enlarged scale of a portion thereof with parts broken away. Fig. 3 is a transverse vertical sectional view taken upon line III—III of Fig. 2. Fig. 4 is a central longitudinal sectional view taken through the burner valve. Fig. 5 is a transverse sectional view taken upon line V—V of Fig. 4. Fig. 6 is an enlarged horizontal sectional view of the feed chamber end of the fuel tank. Fig. 7 is a transverse vertical sectional view of a modified form of burner casing, and, Fig. 8 is a fragmentary longitudinal sectional view of the same.

Referring more in detail to the drawings, it is to be noted the device is adapted to employ any form of volatile fuel such as the well-known hydrocarbons including gasolene; a supply thereof is designed to be contained in the can or tank 10 which is supplied with any desired form of air pump 11 for placing the contained fluid under pressure.

The tank is provided with a dome-shaped end 12 which is secured to a handle 13 preferably formed of wood or other suitable material adapted to prevent excessive heating which would thereby hinder the grasping of said handle when using the instrument.

The dome end 12 has an inner chamber 14 which is separated by a disk, diaphragm or partition 15 from the main chamber 16 of the tank, while outwardly converging pipes 17 are tapped through the partition 15 to effect communication between the chambers 16 and 14 for the passage of the combustible fluid toward the central opening 18 of said dome end, which opening receives the fluid outlet pipe 19 extending through said handle 13 and terminating with one open end slightly spaced from the partition 15 and within the chamber 14. The burner supply pipe 19 extends outwardly from the handle 13 and is provided with a downwardly-curved portion 20 terminating in a dome-curved portion 20 terminating in a dome-disk 21 having an outwardly projecting flange 22 for securing a cylindrical open ended burner casing 23 thereto by means of the screws 24. The burner casing is preferably provided with as many perforations 23ª as may be necessary to supply sufficient air to provide complete combustion. A Y-shaped burner tube 25 has an upwardly bent arm 26 secured in the central axial perforation 27 of the disk 21 by means of the screw 28. The branching members of the Y-tube 25 have closed ended burners 29 secured therein spaced apart within the casing 23 and provided with transverse slots 30 upon their upper sides for purposes of ignition. A valve casing 31 has a shank 32 screw-threaded into the pipe 20 with the inner bore 33 of the valve casing in communication with the bore 34 of the pipe, which bore 34 communicates with a looped pipe 35 positioned between the burners 29 and having its opposite end communicating with the central bore 36 of the pipe 20, which bore 36 communicates with the channel of the fuel supply pipe 19. The casing 31 is provided with an inner chamber 37 communicating with the bore 33 and having an outlet 38 for the fluid fuel, which outlet is controlled by the needle valve 39, the outlet being in direct alinement with the open end of the burner tube arm 26. With this form of construction, it will be apparent that by placing the gasolene or other fluid fuel which is within the chamber 16 under the desired air pressure by means of the pump 11, an opening of the needle valve 39 will allow the air pressure to force the fluid through the pipe 17 for partially filling the chamber 14 and then passing through the pipe 19 and bore 36 and thence through the looped pipe 35 and the bores 34 and 33 to the valve casing 37 to be ejected through the valve opening 38 as controlled by the valve 39 and into the burner Y-tube for supplying the burner pipes 29 with the fluid fuel.

A fuel receiving socket 40 in the enlarged end 41 of the pipe 20 is adapted to receive a small quantity of the hydrocarbon which upon being ignited supplies the initial heat to the burner for starting the same after the usual manner of the gasolene torch, while the looped tube 35 serves as a vaporizing coil during the operation of the burner, the vaporized fluid burning at the slotted outlets 30, it being understood that the supply of vaporized fluid through the valve opening 38 to the burner is regulated by the needle valve 39.

The soldering point 42 is secured in the upper portion of the casing 23 by means of a set screw 43 projecting through the slot 44 of the casing and engaging the soldering point. It will thus be apparent that a continuous heating of the point 42 may be effected during the use of the soldering point while the device may be employed in a vertical position, with the point uppermost in operating upon elevated objects which is made possible by the chamber 14 allowing such a position of the instrument to position the end of the outlet pipe 19 beneath the fluid while allowing an entrance of air through the pipe 17 and at a point removed from the open outlet end of said pipe. The combustion fluid enters the chamber 14 through the pipe 17 when the instrument is positioned otherwise than in such upright position. It is also noted that if desired to heat the extreme point of the soldering iron 42 to a greater degree, the iron 42 may be slid inwardly to a greater extent within the burner casing and may be regulated as desired in its position therein. A foot 45 is provided upon the bottom of the valve member 41 and adapted to maintain the instrument upright when positioned upon a support.

In Figs. 7 and 8, a modification is shown in which the vaporizing tube 35 is dispensed with, and in lieu of such construction, I provide the disk or head 21' with an interior lug 50 positioned beneath the Y-member of the burner tube where it will be subjected to the flame from a jet opening 51 in said Y-member. The fuel supply passage 36' extends into and through this lug, forming a loop communicating with the valve member 31 in the same manner as the previously described construction. The passage 36' is provided with a supply-controlling screw 52 and the block or lug 50 has openings normally closed by screws 53, these openings affording access to the two branches 36' and 34' respectively, of the fuel passage way for the purpose of cleaning the same. The branches 34' and 36' are connected by the small vaporizing chamber 54 in the block 50. The burner casing 23' in this form is shown as provided with air openings 23ᵇ formed by slitting the casing and striking out the metal bounded by the slit. Obviously, apertures punched through the casing will serve the same purpose. By substituting a tube for the burner shown, the device may thus be converted into a blast or torch, or a branding or marking iron may be substituted for the burner.

While the forms of the invention herein shown and described are what are believed to be preferable embodiments thereof, it is nevertheless to be understood that minor changes may be made in the form, proportion and details of construction without departing from the spirit and scope of the invention as set forth in the appended claims.

What I claim as new is:—

1. A soldering instrument comprising a two-part tank, an outlet pipe leading from one part of said tank, a Y-shaped burner positioned at the outer end of said pipe, a vaporizer positioned adjacent said burner and communicating with the bore of said pipe, a valve casing in communication with said pipe bore, a regulating needle valve in said casing, a burner casing surrounding said burner having a slot therein, a slidably-arranged soldering point within said burner casing, and an adjusting screw through said slot and secured to said soldering point.

2. A soldering instrument comprising a two-part tank, an outlet pipe leading from one part of said tank, a Y-shaped burner positioned at the outer end of said pipe, a vaporizer positioned adjacent said burner and communicating with the bore of said pipe, a valve casing in communication with said pipe bore, a regulating needle valve in said casing, a burner casing surrounding said burner having a slot therein, a slidably arranged soldering point within said burner casing, an adjusting screw through said slot and secured to said soldering point, a plate between the two parts of said tank, the said outlet pipe having its open end slightly spaced from said plate, and converging pipes tapped through said plate and communicating between the two parts of said tank and terminating at a distance from the open end of said pipe.

3. A soldering instrument comprising a two-part tank, an outlet pipe leading from one part of said tank, a Y-shaped burner positioned at the outer end of said pipe, a vaporizer positioned adjacent said burner and communicating with the bore of said pipe, a valve casing in communication with said pipe bore, a regulating needle valve in said casing, a plate between the two parts of said tank, the said outlet pipe having its open end slightly spaced from said plate, and converging pipes tapped through said plate and communicating between the two parts of said tank and terminating at a distance from the open end of said pipe.

4. A portable soldering instrument comprising a fuel pressure tank, a division plate within said tank forming a relatively small end chamber, an outlet burner pipe extending into said small chamber and terminating slightly spaced from said plate, supply pipes tapped through said plate and converging toward the end of the tank at a point spaced outwardly from the open end of said burner pipe, and a burner upon the outer end of said burner pipe.

5. A portable soldering instrument comprising a fuel pressure tank, a division plate within said tank forming a relatively small end chamber, an outlet burner pipe extending into said small chamber and terminating slightly spaced from said plate, supply pipes tapped through said plate and converging toward the end of the tank at a point spaced outwardly from the open end of said burner pipe, a burner upon the outer end of said burner pipe, a needle valve regulating means for said burner, a cylindrical casing surrounding said burner and provided with a longitudinal slot, a soldering point shiftably positioned within said casing, and an adjustable securing means positioned through said slot and secured to said point.

In testimony whereof I affix my signature in presence of two witnesses.

JOHN N. KUČERÁ.

Witnesses:
 RUDOLPH J. HURKA,
 A. H. CONN.

Copies of this patent may be obtained for five cents each, by addressing the "Commissioner of Patents, Washington, D. C."